(12) United States Patent
Xu et al.

(10) Patent No.: US 7,682,754 B2
(45) Date of Patent: Mar. 23, 2010

(54) NONAQUEOUS ELECTROLYTIC SOLUTION FOR ELECTROCHEMICAL CELLS

(75) Inventors: Wu Xu, Broadview Heights, OH (US); Zhongyi Deng, Valley View, OH (US); Vaikunth S. Prabhu, Morgantown, WV (US); Pascal Bolomey, Solon, OH (US)

(73) Assignee: Novolyte Technologies, Inc., Zachary, LA (US)

( * ) Notice: Subject to any disclaimer, the term of this patent is extended or adjusted under 35 U.S.C. 154(b) by 1336 days.

(21) Appl. No.: 11/138,769

(22) Filed: May 26, 2005

(65) Prior Publication Data

US 2006/0269845 A1 Nov. 30, 2006

(51) Int. Cl.
*H01M 6/16* (2006.01)

(52) U.S. Cl. .............. 429/339; 429/341; 429/330; 429/231.95; 429/333; 429/337; 429/338; 429/329; 429/231.1; 429/231.2; 429/231.3; 429/231.8; 429/231.5; 429/231.4; 429/225; 429/326; 29/623.3; 29/623.2; 29/623.5

(58) Field of Classification Search ............... 429/339, 429/341, 326, 330, 231.95, 333, 337, 338, 429/329, 231.1, 231.2, 231.3, 231.8, 231.5, 429/231.4, 225; 29/623.3, 623.2, 623.5
See application file for complete search history.

(56) References Cited

U.S. PATENT DOCUMENTS

| | | | |
|---|---|---|---|
| 5,484,670 A | 1/1996 | Angell |
| 5,521,027 A | 5/1996 | Okuno |
| 5,525,443 A | 6/1996 | Okuno |
| 5,554,462 A | 9/1996 | Flandrois |
| 5,626,981 A | 5/1997 | Simon |
| 5,707,759 A | 1/1998 | Simon |
| 5,776,627 A | 7/1998 | Mao |
| 5,786,110 A | 7/1998 | Angell |
| 5,824,433 A | 10/1998 | Angell |
| 5,849,432 A | 12/1998 | Angell |
| 5,855,809 A | 1/1999 | Angell |
| 5,932,632 A | 8/1999 | Biensan |
| 5,962,169 A | 10/1999 | Angell |
| 6,001,325 A | 12/1999 | Salmon |
| 6,033,797 A | 3/2000 | Mao |
| 6,033,808 A | 3/2000 | Salmon |
| 6,071,645 A | 6/2000 | Biensan |
| 6,103,798 A | 8/2000 | Prabhu |
| 6,245,465 B1 | 6/2001 | Angell |
| 6,506,516 B1 | 1/2003 | Wietelmann |
| 2003/0195282 A1 | 10/2003 | King, III |
| 2004/0007688 A1 | 1/2004 | Awano et al. |
| 2004/0151951 A1 | 8/2004 | Hyung |
| 2004/0253512 A1 | 12/2004 | Watanabe |

FOREIGN PATENT DOCUMENTS

| | | | |
|---|---|---|---|
| JP | 1998050344 A | | 2/1998 |
| JP | 2000315504 A | | 11/2000 |
| JP | 2001-023649 | * | 1/2001 |
| JP | 2002208432 A | | 7/2002 |
| WO | WO 01/99209 A2 | | 12/2001 |

OTHER PUBLICATIONS

Kang Xu, Shengshui Zhang, T. Richard Jow, Wu Xu, and C. Austen Angell; "LiBOB as Salt for Lithium-Ion Batteries A Possible Solution for High Temperature Operation"; Electrochemical and Solid-State Letters, 5 (1) A26-A29 (2002); The Electrochemical Society, Inc.

Wu Xu and C. Austen Angell; "LiBOB and Its Derivatives Weakly Coordinating Anions, and the Exceptional Conductivity of Their Nonaqueous Solutions"; Electrochemical and Solid-State Letters, 4 (1) E1-E4 (2001); The Electrochemical Society, Inc.

Kang Xu, Shengshui Zhang, Bruce A. Poese, and T. Richard Jow; "Lithium Bis(oxalato)borate Stablizes Graphite Anode in Propylene Carbonate"; Electrochemical and Solid-State Letters, 5 (11) A259-A262 (2002); The Electrochemical Society, Inc.

Commonly Owned U.S. Appl. No. 11/113,966, filed Apr. 25, 2005.
Commonly Owned U.S. Appl. No. 11/138,907, filed May 26, 2005.
Commonly Owned U.S. Appl. No. 11/138,905, filed May 26, 2005.
Commonly Owned U.S. Appl. No. 11/113,823, filed Apr. 25, 2005.
Commonly Owned U.S. Appl. No. 11/196,782, filed Aug. 3, 2005.

* cited by examiner

*Primary Examiner*—Laura S Weiner
(74) *Attorney, Agent, or Firm*—Rankin, Hill & Clark LLP

(57) ABSTRACT

The invention relates to the use of an amine oxide as an additive in a nonaqueous electrolytic solution. The electrolytic solution is suitable for use in electrochemical cells such as lithium batteries and lithium ion batteries. Batteries using this electrolyte solution have long life and high capacity retention.

18 Claims, 1 Drawing Sheet

NONAQUEOUS ELECTROLYTIC SOLUTION FOR ELECTROCHEMICAL CELLS

BACKGROUND OF THE INVENTION

1. Field of Invention

The present invention relates to the field of nonaqueous electrolytic solutions and batteries using the same. More particularly, this invention pertains to nonaqueous electrolytic solutions comprising (a) one or more solvents; (b) one or more ionic salts; and (c) one or more amine oxides. Rechargeable batteries comprising such nonaqueous electrolytic solutions are disclosed herein as well as methods of making nonaqueous electrolytic solutions with amine oxides to scavenge moisture and free acid in lithium batteries and lithium ion batteries.

2. Description of Related Art

Electric current producing cells such as batteries consist of pairs of electrodes of opposite polarity separated by electrolytic solution, which includes a solvent and a solute. The charge flow between electrodes is maintained by an ionically conducting solute, i.e., a salt. The non-aqueous electrolytic solutions, which are used in lithium and lithium ion batteries, are made by dissolving lithium salts in a variety of organic solvents. In particular, nonaqueous electrolytes comprising lithium hexafluorophosphate ($LiPF_6$) exhibit very good electrochemical stability and conductivity. However, $LiPF_6$ is not thermally stable and readily decomposes by hydrolysis, as set forth in the following well-known reactions:

$$LiPF_6 \rightarrow LiF + PF_5 \quad (1)$$

$$LiPF_6 + H_2O \rightarrow 2HF + LiF + POF_3 \quad (2)$$

Thermal decomposition of $LiPF_6$ occurs at elevated temperatures (Reaction 1), and is accelerated in solution due to the reactions of $PF_5$ and solvents. Hydrolysis (Reaction 2) generally occurs due to moisture and acidic impurities in the lithium salt and electrolytic solution. Accordingly, both water and hydrogen fluoride (HF) are undesirable in lithium and lithium-ion battery systems. The strong acid HF is especially harmful to batteries because it reacts with electrode active materials and corrodes the solid electrolyte interface (SEI), which results in poor battery performance. Thus the performance of such an electrolytic solution, and hence of a battery made therewith, is not optimal.

On the other hand, due to the large difference between the polarity of cyclic esters such as ethylene carbonate (EC), propylene carbonate (PC), and gamma-butyrolactone (GBL) and the polarity of polypropylene and/or polyethylene separator membranes, the electrolyte solution cannot achieve very good wetting of the polypropylene and/or polyethylene separator membrane. Thus the performance of the electrolytic solution, and hence of the battery made therewith, is not optimal.

SUMMARY OF THE INVENTION

The present invention provides a stable nonaqueous electrolytic solution for use in secondary batteries, and a secondary battery using the same. The non-aqueous electrolytic solution comprises an amine oxide. It is believed that the use of an amine oxide in a secondary battery is novel. In particular, the present invention provides a secondary battery comprising an anode, a cathode, and an electrolytic solution. The electrolytic solution comprises a non-aqueous solvent, a salt, and an amine oxide. A battery made with the non-aqueous electrolytic solution comprising amine oxide has a long cycle life and high discharge capacity retention.

The present invention provides a nonaqueous electrolytic solution comprising an amine oxide. Amine oxides, which are electrically neutral, act as a scavenger for moisture and free acid and as a surfactant for wetting the polypropylene and/or polyethylene separator membrane in lithium and lithium ion batteries.

The electrolytic solution in the present invention comprises (a) one or more solvents and (b) one or more lithium salts; and (c) one or more amine oxides. Typical lithium salts include $LiPF_6$, $LiBF_4$, $LiB(C_2O_4)$ (i.e. LiBOB), however others may be used. Solvents include ethylene carbonate (EC), propylene carbonate (PC), dimethyl carbonate (DMC), diethyl carbonate (DEC), ethylmethyl carbonate (EMC), gamma-butyrolactone (GBL), methyl butyrate (MB), and propyl acetate (PA), however other non-aqueous solvents could be used. The amine oxide has Formula (I) (which may also be indicated by $R^1R^2R^3N \rightarrow O$) wherein $R^1$, $R^2$, and $R^3$ are independently each a $C_1$ to $C_{36}$ hydrocarbon residue.

(Formula I)

In particular, the invention provides a secondary battery comprising an anode, a cathode comprising lithium, and an electrolytic solution. The electrolytic solution comprises a non-aqueous solvent, a salt, and an amine oxide having Formula (I), as above.

The invention further includes a method of making a lithium battery or lithium ion battery comprising: providing an electrolytic solution comprising a non-aqueous electrolytic solvent and a lithium containing salt, and an amine oxide having Formula (I) wherein $R^1$, $R^2$, and $R^3$ are independently each a $C_1$ to $C_{36}$ hydrocarbon residue; laminating and winding a cathode, a first porous separator, an anode, and a second porous separator; placing the wound laminated electrodes and separators in a battery case; infusing the electrolytic solution into the battery case, and sealing the battery case containing the electrodes, electrolytic solution and separators.

These and other features and advantages of the present invention will become more readily apparent to those skilled in the art upon consideration of the following detailed description that described both the preferred and alternative embodiments of the present invention.

DETAILED DESCRIPTION OF THE INVENTION

Figure 1:
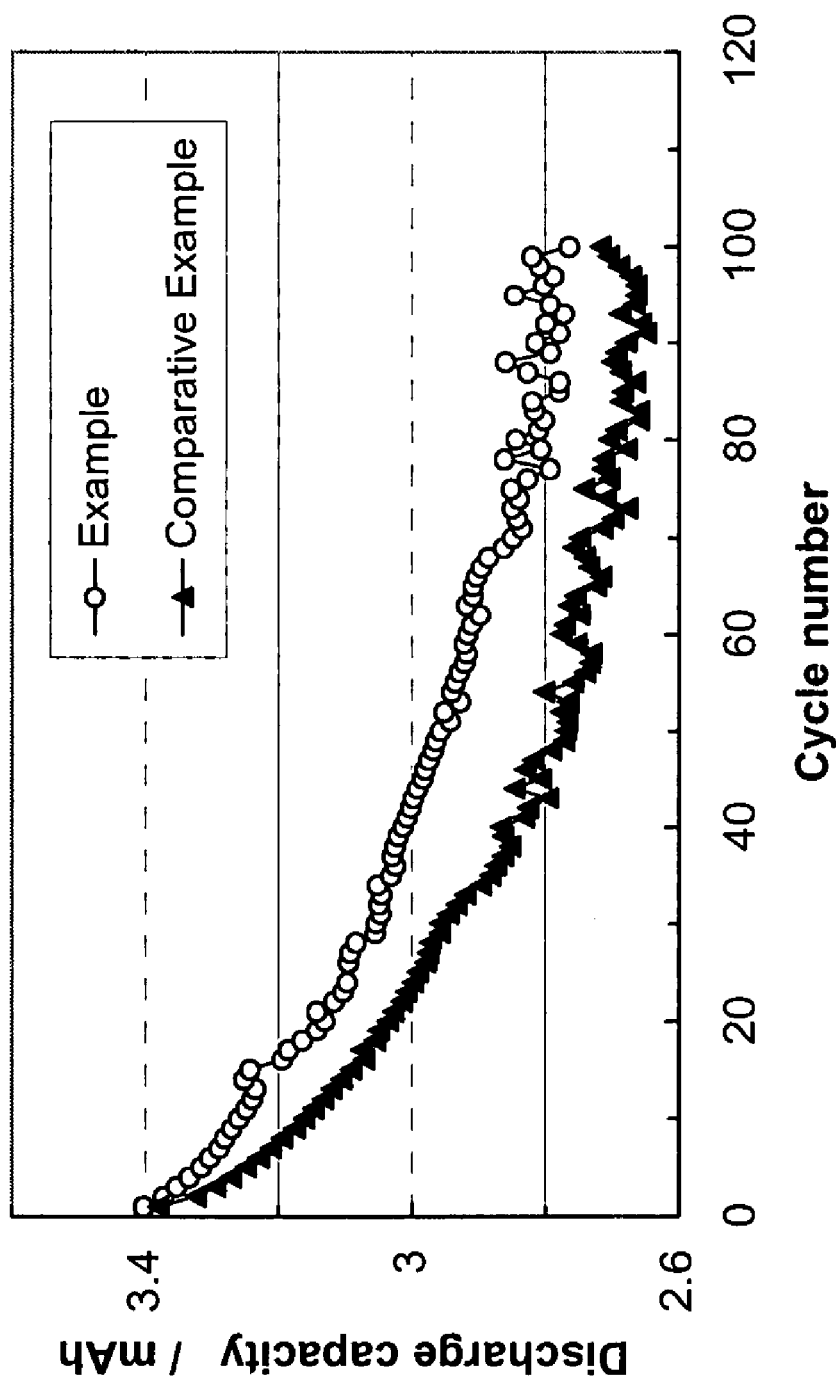
FIG. 1 shows the results of life cycle testing for a 2032 coin type cell containing 1.0 M $LiPF_6$ and 0.1 wt % Genox® EP amine oxide in EC/DMC/EMC solvent (1:1:1 by weight).

The following embodiments describe the preferred modes presently contemplated for carrying out the invention and are not intended to describe all possible modifications and variations consistent with the spirit and purpose of the invention. These and other features and advantages of the present invention will become more readily apparent to those skilled in the art upon consideration of the following detailed description that described both the preferred and alternative embodiments of the present invention.

Trialkyl amine oxides, or tertiary amine oxides, are generally known as organic surfactants. Such surfactants are widely commercially used as additives for products such as shampoos, hair conditioners, soaps, dish and laundry detergents, cleaners, fabric softeners, gasoline, agricultural formulation, deodorant sticks, cellulose extrusion products, and thermoplastic resins.

It is also known that trialkyl amine oxides are strongly hygroscopic. Further, the nitrogen atom in the trialkyl amine oxide molecule can react with free acid in the electrolyte solution to form a quaternary ammonium salt. It can also coordinate with phosphorous pentafluoride ($PF_5$) generated by the thermal decomposition of lithium hexafluorophosphate ($LiPF_6$) as indicated in the aforementioned Reaction 1.

Broadly, a secondary battery (and a method of making such a battery) is disclosed, which comprises an anode, a cathode and an electrolytic solution. The electrolytic solution comprises a non-aqueous solvent, a solute (i.e., a salt) and an amine oxide. These major ingredients are detailed hereinbelow.

Amine Oxide. The amine oxide is a tertiary amine oxide as represented by general Formula (I):

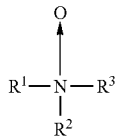

In Formula (I), $R^1$, $R^2$ and $R^3$ are each a $C_1$-$C_{36}$ residue that may optionally contain at least one —O—, —S—, —CO—, —$CO_2$—, —SO—, —$SO_2$—, —$NR^4$—, —$NR^4R^5$, —$PR^6$—, or —$Si(R^7R^8)$—, wherein $R^4$ to $R^8$ are independently selected from the group consisting of hydrogen, halogen, $C_1$-$C_{20}$ saturated alkyl, $C_1$-$C_{20}$ alkenyl, or phenyl. By "alkyl," "alkenyl," and "phenyl" are also comprehended such residues having substituents, i.e., substituted alkyl, substituted alkenyl and substituted phenyl. Each of $R^1$, $R^2$, and $R^3$ may be saturated or unsaturated. Saturated residues are preferred. The $R^1$, $R^2$, and $R^3$ residues also include phenyl and substituted phenyl groups. It is also possible for each of $R^1$, $R^2$, and $R^3$ to be the same residue. $R^1$ and $R^2$ are preferably $C_8$-$C_{26}$ residues and most preferably $C_{10}$-$C_{20}$ residues, and $R^3$ is preferably a $C_1$-$C_{22}$ residue and most preferably a $C_1$ residue (e.g., methyl). In a preferred embodiment, in the additive formula, $R^1$ and $R^2$ are independently each a $C_{10}$-$C_{26}$ hydrocarbon residue and $R^3$ is a $C_1$ hydrocarbon residue. More preferred is when $R^1$ and $R^2$ are independently each a $C_{14}$-$C_{24}$ hydrocarbon residue. Preferred amine oxides also include those wherein $R^1$, $R^2$, and $R^3$ are the same $C_6$-$C_{36}$ residues. Preferably, all of the aforementioned residues for $R^1$, $R^2$, and $R^3$ are saturated hydrocarbon residues or saturated hydrocarbon residues containing at least one of the aforementioned —O—, —S—, —CO—, —$CO_2$—, —SO—, —$SO_2$—, —$NR^4$—, —$NR^4R^5$, —$PR^6$—, or —$Si(R^7R^8)$—, wherein $R^4$ to $R^8$ are independently selected from the group consisting of hydrogen, halogen, $C_1$-$C_{20}$ saturated alkyl, $C_1$-$C_{20}$ alkenyl, or substituted alkyl, phenyl, or substituted phenyl. The saturated amine oxide of the present invention may also include poly (amine oxide). By poly(amine oxide) is meant tertiary amine oxides containing at least two tertiary amine oxides per molecule. It is preferred that the electrolytic solution comprises about 0.01 to about 10 wt %, preferably about 0.05 to about 5 wt % and more preferably about 0.1 to about 3 wt % of an amine oxide.

The electrolytic solutions comprising an amine oxide have a low level of residual moisture and acids thereby limiting or reducing decomposition and hydrolysis of the lithium salts and increasing the stability of the lithium salts, and therefore, of the electrolytic solutions. Preferred embodiments of the invention are described below for the treatment of $LiPF_6$ based electrolytes but the invention is not limited thereto and may be used with lithium salts in general such as $LiPF_6$, $LiBF_4$, $LiAsF_6$, $LiSbF_6$, LiBOB, $LiCF_3SO_3$, $LiN(SO_2CF_3)_2$, and others, as well as combinations of such salts.

In the electrolytic solution the amine oxides having the aforementioned formula (I) may be selected from the group consisting of tri(4-aminobutyl)amine oxide, tri(6-aminohexyl) amine oxide, tri(10-aminodecyl)amine oxide, tri(4-cyclohexyl)amine oxide, dioctyl methyl amine oxide, trioctyl amine oxide, didecyl methyl amine oxide, tridecyl amine oxide, didodecyl methyl amine oxide, tridodecyl amine oxide, dihexadecyl methyl amine oxide, trihexadecyl amine oxide, di(coco alkyl)methyl amine oxide, tri(coco alkyl) amine oxide, di(tallow alkyl) methyl amine oxide, tri(tallow alkyl)amine oxide, tri($C_{20}$-$C_{22}$)amine oxide, and di($C_{20}$-$C_{22}$ alkyl)methyl amine oxide. By the term "coco alkyl" is meant hydrogenated $C_{12}$-$C_{14}$ alkyl commonly referred to as hydrogenated coconut oil. By the term "tallow alkyl" is meant hydrogenated $C_{16}$-$C_{18}$ alkyl commonly referred to as hydrogenated tallow oil. Hydrogenated tallow oil is described in U.S. Pat. No. 4,876,300. The aforementioned hydrogenated coconut oil and hydrogenated tallow oil do contain some percentage of higher and/or lower carbon chain lengths than are described above and it should be understood that these other fractions are within the scope of the present invention. It is preferred that at least 75% of the carbon chains be within the described ranges for the coconut oil and tallow oil.

Alternatively, the groups $R^1$, $R^2$, and $R^3$ may be independently selected from alkyl, aryl, aralkyl, alkaryl, cycloalkyl, alkcycloalkyl and cycloalkalkyl and each have from 1 to 36 carbon atoms per group, provided that if one of $R^1$, $R^2$, and $R^3$ is an alkyl group having from 6 to 36 carbon atoms per group, then the other two of $R^1$, $R^2$, and $R^3$ cannot both be alkyl groups having from 1 to 5 carbon atoms per group. "Alkcycloalkyl" refers to -alkylene-cycloalkyl groups preferably having from 1 to 10 carbon atoms in the alkylene moiety and from 3 to 8 carbon atoms in the cycloalkyl moiety. Such alkcycloalkyl groups are exemplified by —$CH_2$-cyclopropyl, —$CH_2$-cyclopentyl, —$CH_2CH_2$-cyclohexyl, and the like. "Alkcycloalkoxy" refers to —O-alkylene-cycloalkyl groups preferably having from 1 to 10 carbon atoms in the alkylene moiety and from 3 to 8 carbon atoms in the cycloalkyl moiety. Such alkcycloalkoxy groups are exemplified by —$OCH_2$-cyclopropyl, —$OCH_2$-cyclopentyl, —$OCH_2CH_2$-cyclohexyl, and the like.

Salts. The salts herein are ionic salts containing at least one metal ion. Typically this metal ion is lithium ($Li^+$). The salts herein function to transfer charge between the anode and the cathode of a battery. One class of salts includes lithium salts that are perhalogenated, or peroxidated, for example, $LiPF_6$, $LiBF_4$, $LiAsF_6$, $LiTaF_6$, $LiAlCl_4$, $Li_2B_{10}Cl_{10}$, $LiClO_4$, $LiCF_3SO_3$, $LiN(SO_2C_mF_{2m+1})(SO_2C_nF_{2n+1})$, and $LiC(SO_2C_kF_{2k+1})(SO_2C_mF_{2m+1})(SO_2C_nF_{2n+1})$, wherein k=1-10, m=1-10, and n=1-10, respectively; $LiN(SO_2C_pF_{2p}SO_2)$, and $LiC(SO_2C_pF_{2p}SO_2)(SO_2C_qF_{2q+1})$ wherein p=1-10 and q=1-10; $LiPF_x(R_F)_{6-x}$, and $LiBF_y(R_F)_{4-y}$, wherein $R_F$ represents perfluorinated $C_1$-$C_{20}$ alkyl groups or perfluorinated aromatic groups, x=0-5 and y=0-3. Another class of salts useful herein includes lithium salts of chelated orthoborates and chelated orthophosphates (collectively, hereinafter, "ortho-salts"). In a preferred embodiment, the ortho-salt is lithium bis(oxalato) borate (LiBOB). Other ortho-salts may be used as well, either instead of or in addition to, LiBOB, for example, lithium bis(malonato)borate (LiBMB), lithium bis(difluoromalonato)borate (LiBDFMB), lithium (malonato oxalato)borate (LiMOB), lithium (difluoromalonato oxalato)borate (LiDFMOB), lithium tris(oxalato)phosphate (LiTOP), and lithium tris(difluoromalonato) phosphate (LiTDFMP). Any combination of two or more of the aforementioned salts may also be used.

Broadly, the concentration of salts in the electrolytic solution is about 0.01-2.5 M (moles per liter). Preferably the total of all salts in the electrolytic solution is about 1 wt % to about 50 wt %, preferably about 3 wt % to about 35 wt % and more preferably about 5 wt % to about 25 wt %. Most preferably the electrolytic solution comprises $LiPF_6$.

Solvent. The solvent is a non-aqueous, aprotic, polar organic substance which dissolves the salt at room temperature, i.e., 25° C. Blends of more than one solvent may be used. Generally, solvents may be carbonates, carboxylates, lactones, phosphates, five or six member heterocyclic ring compounds, and organic compounds having at least one $C_1$-$C_4$ group connected through an oxygen atom to a carbon. Lactones may be methylated, ethylated and/or propylated. Generally, the electrolytic solution comprises at least one salt dissolved in at least one solvent. Useful solvents herein include ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl) phosphate, tris(2,2,2-trifluoroethyl) phosphate, tripropyl phosphate, triisopropyl phosphate, tributyl phosphate, trihexyl phosphate, triphenyl phosphate, tritolyl phosphate, and combinations thereof. Other solvents may be used so long as they are non-aqueous and aprotic, and are capable of dissolving the salts. Solvents commercially available under the Purolyte® name from Ferro Corporation, Cleveland Ohio, are suitable.

Overall, the non-aqueous electrolytic solution comprises about 20 wt % to about 99 wt %, preferably about 50 wt % to about 97 wt % and more preferably about 70 wt % to about 95 wt % of one or more solvents. In a preferred embodiment, the solvent is selected from the group consisting of ethylene carbonate (EC), propylene carbonate (PC), dimethyl carbonate (DMC), ethyl methyl carbonate (EMC), diethyl carbonate (DEC) and combinations thereof. In another preferred embodiment, the solvent comprises about 1-60% wt % EC, and about 1-99 wt % DMC, and about 1-99 wt % EMC. In another preferred embodiment, the non-aqueous solvent comprises EC, DMC and EMC in a weight ratio of 1:1:1.

Cathode. The cathode comprises a lithium metal oxide compound. In particular, the cathode comprises at least one lithium mixed metal oxide (MMO). Lithium MMOs contain at least one other metal selected from the group consisting of Mn, Co, Cr, Fe, Ni, V, and combinations thereof. For example the following lithium MMOs may be used in the cathode: $LiMnO_2$, $LiMn_2O_4$, $LiCoO_2$, $Li_2Cr_2O_7$, $Li_2CrO_4$, $LiNiO_2$, $LiFeO_2$, $LiNi_zCo_{1-z}O_2$ (0<z<1), $LiFePO_4$, $Li_3VPO_4$, $LiMn_{0.5}Ni_{0.5}O_2$, $LiMn_{1/3}Co_{1/3}Ni_{1/3}O_2$, $LiNi_rCo_sMe_tO_2$ wherein Me may be one or more of Al, Mg, Ti, B, Ga, or Si and 0<r,s,t<, and $LiMc_{0.5}Mn_{1.5}O_4$ wherein Mc is a divalent metal, and mixtures thereof.

Anode. The anode may comprise carbon or compounds of lithium. The carbon may be in the form of graphite. Lithium metal anodes may be used. Lithium mixed metal oxides (MMOs) such as $LiMnO_2$ and $Li_4Ti_5O_{12}$ are also envisioned. Alloys of lithium with transition or other metals (including metalloids) may be used, including LiAl, LiZn, $Li_3Bi$, $Li_3Cd$, $Li_3Sd$, $Li_{4.4}Si$, $Li_{4.4}Pb$, $Li_{4.4}Sn$, $LiC_6$, $Li_3FeN_2$, $Li_{2.6}Co_{0.4}N$, $Li_{2.6}Cu_{0.4}N$, and combinations thereof. The anode may further comprise an additional material such as a metal oxide including SnO, $SnO_2$, GeO, $GeO_2$, $In_2O$, $In_2O_3$, PbO, $PbO_2$, $Pb_2O_3$, $Pb_3O_4$, $Ag_2O$, AgO, $Ag_2O_3$, $Sb_2O_3$, $Sb_2O_4$, $Sb_2O_5$, SiO, ZnO, CoO, NiO, FeO, and combinations thereof.

Either the anode or the cathode, or both, may further comprise a polymeric binder. In a preferred embodiment, the binder may be polyvinylidene fluoride, styrene-butadiene rubber, polyamide or melamine resin, or combinations thereof.

The electrolytic solution in the present invention may further comprise one or more additives, such as a vinyl compound (e.g. vinylene carbonate, vinyl ethylene carbonate) to help generate a stable solid electrolyte interface at the surface of the graphite anode so as to increase the cycle life characteristic of the battery, and/or a sultone (e.g., 1,3-propane sultone, and 1,4-butane sultone) to prevent or to reduce gas generation of the electrolytic solution as the battery is charged and discharged at temperatures higher than ambient temperature, and/or an aromatic compound (e.g., biphenyl and cyclohexylbenzene) to prevent overcharge or overdischarge of the battery.

It is envisioned that the electrolytic solutions and batteries discussed herein have a wide range of applications, including, at least, radios, televisions, calculators, wrist watches, hearing aids, electronics such as computers, cell phones, games etc, and transportation applications such as battery powered and/or hybrid vehicles.

EXAMPLES

The following compositions represent exemplary embodiments of the invention. They are presented to explain the invention in more detail, and do not limit the invention.

(1) Preparation of the Non-aqueous electrolytic solutions. The starting point for the examples was to blend a solvent mixture of EC/DMC/EMC (1:1:1 by weight) and add $LiPF_6$ until a non-aqueous electrolytic solution having a $LiPF_6$ concentration of 1.0 M was obtained. The solvents are available under the Purolyte® name from Ferro Corporation. This formed the non-aqueous electrolytic solution used in the Comparative Example. For the Working Example, a trialkyl amine oxide available from Crompton Corporation, Middlebury, Conn., under the name Genox® EP (dialkyl methyl amine oxide, Chemical Abstracts Service Registry Number 204933-93-7) was added to the above non-aqueous electrolytic solution in an amount of 0.1% based on the total weight of the solution, to give the electrolytic solution. The blending and testing was carried out at room temperature (i.e., 25° C.). A battery using each of these non-aqueous electrolytic solutions was also made.

(2) Preparation of a Cathode. A positive electrode slurry was prepared by dispersing $LiCoO_2$ (positive electrode active material, 90 wt %), poly(vinylidenefluoride) (PVdF, binder, 5 wt %), and acetylene black (electro-conductive agent, 5 wt %) into 1-methyl-2-pyrrolidone (NMP). The slurry was coated on aluminum foil, dried, and compressed to give a cathode. The cathode was die-cut into discs by a punch with a diameter of 12.7 mm.

(3) Preparation of an Anode. Artificial graphite (as negative electrode active material, 95 wt %) and PVdF (as binder, 5 wt %) were mixed into NMP to give a negative active material slurry which was coated on copper foil, dried, and pressed to give a negative electrode. The anode electrode was die-cut into discs by a punch with a diameter of 14.3 mm.

(4) Assembly of a Lithium Ion Secondary Battery. In a dry box under an argon atmosphere, a lithium ion secondary battery was assembled using a 2032 type coin cell. That is, a cathode was placed on a cathode can, and a microporous polypropylene film (25 μm thickness and 19.1 mm diameter) was put thereon as a separator. It was pressed with a polypropylene gasket, and then an anode was placed. A stainless steel spacer and spring were put thereon to adjust thickness and to make a good contact. The electrolytic solution of the Working Example and the Comparative Example was added to each of the two batteries and allowed to absorb. Then, an anode cover was mounted thereon to seal the batteries by a crimper, thus completing the assembly of the coin type lithium ion secondary batteries.

(5) Testing of the Batteries. Evaluation of the aforementioned assembled batteries (e.g., Working Example and Comparative Example) was carried out in the order (A) initial charging and discharging (confirmation of capacity) and (B) life cycle test.

A. Capacity Confirmation. Initial charging and discharging of the aforementioned assembled batteries were performed according to the constant current/voltage charging and constant current discharging method in a room temperature atmosphere. The battery was first charged up to 4.2 Volts (V) at a constant current rate of 0.5 mA/cm$^2$ (milliamps per square centimeter). After reaching 4.2 V, the battery was continually charged at a constant voltage of 4.2 V until the charging current reached 0.1 mA or less. Then the battery was discharged at a constant current rate of 0.5 mA/cm$^2$ until the cut-off voltage 3.0 V reached. Standard capacity (C) of a nonaqueous electrolyte secondary battery was 3.4 mAh (milliamp hours).

B. Life Cycle Test. Life cycle testing was conducted over 100 cycles at room temperature by charging the aforementioned initially charged/discharged batteries at a constant current rate of C/2 (1.7 mA) to 4.2 V and then charged at a constant voltage of 4.2 V till the current reached 0.1 mA or less. After that the battery was discharged at a constant current rate of C/2 (1.7 mA) until the cut-off voltage 3.0 V reached. Discharge capacity retention rate of cycle life (%)=($n^{th}$ cycle discharge capacity/$1^{st}$ cycle discharge capacity)×100%. First cycle efficiency is cycle discharge capacity/$1^{st}$ cycle charge capacity×100%. Table 1 displays the results of the life cycle testing.

TABLE 1

Life Cycle Testing Results for 1.0 M LiPF$_6$ and 0.1 wt % Genox ® EP amine oxide in EC/DMC/EMC (1:1:1 by weight)

| Electrolyte | $1^{st}$ cycle discharge capacity (mAh) | $1^{st}$ cycle efficiency | Discharge capacity retention | |
|---|---|---|---|---|
| | | | $50^{th}$ cycle | $100^{th}$ cycle |
| Working Example | 3.40 | 95.5% | 87.0% | 81.2% |
| Comparative Example | 3.38 | 94.5% | 82.0% | 80.4% |

Additional advantages and modifications will readily occur to those skilled in the art. Therefore, the invention in its broader aspects is not limited to the specific details and illustrative example shown and described herein. Accordingly, various modifications may be made without departing from the spirit or scope of the general invention concept as defined by the appended claims and their equivalents.

What is claimed is:

1. A secondary battery comprising
   a. an anode,
   b. a cathode comprising lithium, and
   c. an electrolytic solution comprising
      i. a non-aqueous solvent,
      ii. a salt, and
      iii. an amine oxide having the formula

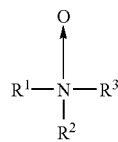

wherein $R^1$ and $R^2$ are independently each a $C_6$ to $C_{36}$ hydrocarbon group, and $R^3$ is a $C_1$ to $C_{36}$ hydrocarbon group.

2. The secondary battery of claim 1 wherein the hydrocarbon group of at least one of $R^1$, $R^2$, and $R^3$, includes at least one substituent selected from the group consisting of —O—, —S—, —CO—, —CO$_2$—, —SO—, —SO$_2$—, —NR$^4$—, —NR$^4$R$^5$, —PR$^6$—, or —Si(R$^7$R$^8$)—, wherein $R^4$ to $R^8$ are independently selected from the group consisting of hydrogen, halogen, $C_1$ to $C_{20}$ saturated alkyl, $C_1$-$C_{20}$ alkenyl, phenyl, and combinations thereof.

3. The secondary battery of claim 1 wherein $R^1$ and $R^2$ are independently each a $C_8$ to $C_{26}$ hydrocarbon group and $R^3$ is a $C_1$ to $C_{22}$ hydrocarbon group.

4. The lithium secondary battery of claim 1 wherein the amine oxides are selected from the group consisting of tri(6-aminohexyl)amine oxide, tri(10-aminodecyl)amine oxide, tri(4-cyclohexyl)amine oxide, dioctyl methyl amine oxide, trioctyl amine oxide, didecyl methyl amine oxide, tridecyl amine oxide, didodecyl methyl amine oxide, tridodecyl amine oxide, dihexadecyl methyl amine oxide, trihexadecyl amine oxide, di(coco alkyl)methyl amine oxide, tri(coco alkyl) amine oxide, di(tallow alkyl)methyl amine oxide, tri(tallow alkyl)amine oxide, tri($C_{20}$-$C_{22}$)amine oxide, and di($C_{20}$-$C_{22}$ alkyl)methyl amine oxide, and combinations thereof.

5. The secondary battery of claim 1 wherein the salt is selected from the group consisting of LiPF$_6$, LiBF$_4$, LiSbF$_6$, LiAsF$_6$, LiTaF$_6$, LiAlCl$_4$, Li$_2$B$_{10}$Cl$_{10}$, LiBOB, LiBMB, LiBDFMB, LiMOB, LiDFMOB, LiTOP, LiTDFMP, LiClO$_4$, LiCF$_3$SO$_3$; LiN(SO$_2$C$_m$F$_{2m+1}$)(SO$_2$C$_n$F$_{2n+1}$), and LiC(SO$_2$C$_k$F$_{2k+1}$)(SO$_2$C$_m$F$_{2m+1}$)(SO$_2$C$_n$F$_{2n+1}$), wherein k=1-10, m=1-10, and n=1-10, respectively; LiN(SO$_2$C$_p$F$_{2p}$SO$_2$), and LiC(SO$_2$C$_p$F$_{2p}$SO$_2$)(SO$_2$C$_q$F$_{2q+1}$) wherein p=1-10 and q=1-10; and LiPF$_x$(R$_F$)$_{6-x}$ and LiBF$_y$(R$_F$)$_{4-y}$, wherein R$_F$ represents perfluorinated $C_1$-$C_{20}$ alkyl groups or perfluorinated aromatic groups, x=0-5, and y=0-3.

6. The secondary battery of claim 1 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl)phosphate, tris(2,2,2-trifluoroethyl)phosphate, tripropyl phosphate, triisopropyl phosphate, tributyl phosphate, trihexyl phosphate, triphenyl phosphate, tritolyl phosphate, and combinations thereof.

7. The secondary battery of claim 1 wherein the electrolytic solution comprises:
   a. about 20 to about 99 wt % of the non-aqueous solvent,
   b. about 1 to about 50 wt % of the salt, and
   c. about 0.01 to about 10 wt % of the amine oxide.

8. The secondary battery of claim 1, wherein the non-aqueous electrolytic solution comprises:
   a. ethylene carbonate, dimethyl carbonate and ethylmethyl carbonate;
   b. LiPF$_6$, and
   c. an amine oxide having the formula

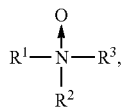

wherein R$^1$ and R$^2$ are independently each a C$_{14}$-C$_{24}$ hydrocarbon group.

9. The secondary battery of claim 1 wherein the non-aqueous electrolytic solution comprises:
   a. ethylene carbonate, dimethyl carbonate and ethylmethyl carbonate in a 1:1:1 weight ratio;
   b. LiPF$_6$ in a concentration of about 1.0 M,
   c. and wherein, in the amine oxide having the formula

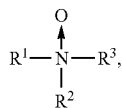

R$^1$ and R$^2$ are independently each a C$_{14}$-C$_{24}$ hydrocarbon group.

10. A method of making a lithium battery or lithium ion battery comprising:
    a. providing an electrolytic solution comprising
       i. a non-aqueous solvent,
       ii. a lithium containing salt, and
       iii. an amine oxide having the formula

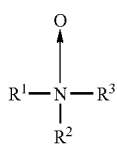

wherein R$^1$ and R$^2$ are independently each a C$_6$ to C$_{36}$ hydrocarbon group, and R$^3$ is a C$_1$ to C$_{36}$ hydrocarbon group,
    b. laminating and winding a cathode, a first porous separator, an anode, and a second porous separator,
    c. placing the wound laminated electrodes and separators in a battery case,
    d. infusing the electrolytic solution into the battery case, and
    e. sealing the battery case containing the electrodes, electrolytic solution and separators.

11. The method of claim 10 wherein the hydrocarbon group of at least one of R$^1$, R$^2$, and R$^3$ includes —O—, —S—, —CO—, —CO$_2$—, —SO—, —SO$_2$—, —NR$^4$—, —NR$^4$R$^5$, —PR$^6$—, or —Si(R$^7$R$^8$)—, wherein R$^4$ to R$^8$ are independently selected from the group consisting of hydrogen, halogen, C$_1$ to C$_{20}$ saturated alkyl, C$_1$-C$_{20}$ alkenyl, or substituted alkyl, phenyl, or substituted phenyl, or combinations thereof.

12. The method of claim 10 wherein R$^1$ and R$^2$ are independently each a C$_8$ to C$_{26}$ hydrocarbon group and R$^3$ is a C$_1$ to C$_{22}$ hydrocarbon group.

13. The method of claim 10 wherein R$^1$ and R$^2$ are independently each a C$_{10}$ to C$_{26}$ hydrocarbon group and R$^3$ is a C$_1$ hydrocarbon group.

14. The method of claim 10 wherein R$^1$, R$^2$, and R$^3$ are each the same C$_6$ to C$_{36}$ hydrocarbon group.

15. The method of claim 10 wherein the non-aqueous solvent is selected from the group consisting of ethylene carbonate, propylene carbonate, butylene carbonate, dimethyl carbonate, diethyl carbonate, dipropyl carbonate, dibutyl carbonate, ethyl methyl carbonate, methyl propyl carbonate, ethyl propyl carbonate, tetrahydrofuran, 2-methyl tetrahydrofuran, 1,3-dioxolane, 1,4-dioxane, 1,2-dimethoxyethane, 1,2-diethoxyethane, 1,2-dibutoxyethane, acetonitrile, dimethylformamide, methyl formate, ethyl formate, propyl formate, butyl formate, methyl acetate, ethyl acetate, propyl acetate, butyl acetate, methyl propionate, ethyl propionate, propyl propionate, butyl propionate, methyl butyrate, ethyl butyrate, propyl butyrate, butyl butyrate, γ-butyrolactone, 2-methyl-γ-butyrolactone, 3-methyl-γ-butyrolactone, 4-methyl-γ-butyrolactone, β-propiolactone, δ-valerolactone, trimethyl phosphate, triethyl phosphate, tris(2-chloroethyl)phosphate, tris(2,2,2-trifluoroethyl)phosphate, tripropyl phosphate, triisopropyl phosphate, tributyl phosphate, trihexyl phosphate, triphenyl phosphate, tritolyl phosphate, and combinations thereof.

16. The method of claim 10 wherein the lithium containing salt is selected from the group consisting of LiPF$_6$, LiBF$_4$, LiSbF$_6$, LiAsF$_6$, LiTaF$_6$, LiAlCl$_4$, Li$_2$B$_{10}$Cl$_{10}$, LiBOB, LiBMB, LiBDFMB, LiMOB, LiDFMOB, LiTOP, LiTDFMP, LiClO$_4$, LiCF$_3$SO$_3$; LiN(SO$_2$C$_m$F$_{2m+1}$)(SO$_2$C$_n$F$_{2n+1}$), and LiC(SO$_2$C$_k$F$_{2k+1}$)(SO$_2$C$_m$F$_{2m+1}$)(SO$_2$C$_n$F$_{2n+1}$), wherein k=1-10, m=1-10, and n=1-10, respectively; LiN(SO$_2$C$_p$F$_{2p}$SO$_2$), and LiC(SO$_2$C$_p$F$_{2p}$SO$_2$)(SO$_2$C$_q$F$_{2q+1}$) wherein p=1-10 and q=1-10; and LiPF$_x$(R$_F$)$_{6-x}$ and LiBF$_y$(R$_F$)$_{4-y}$, wherein R$_F$ represents perfluorinated C$_1$-C$_{20}$ alkyl groups or perfluorinated aromatic groups, x=0-5, and y=0-3.

17. The method of claim 10 wherein the cathode comprises: a lithium mixed metal oxide selected from the group consisting of LiMnO$_2$, LiMn$_2$O$_4$, LiCoO$_2$, Li$_2$Cr$_2$O$_7$, Li$_2$CrO$_4$, LiNiO$_2$, LiFeO$_2$, LiNi$_x$Co$_{1-x}$O$_2$ (0<x<1), LiFePO$_4$, Li$_3$VPO$_4$, LiMn$_{0.5}$Ni$_{0.5}$O$_2$, LiMn$_{1/3}$Co$_{1/3}$Ni$_{1/3}$O$_2$, LiNi$_x$Co$_y$Me$_z$O$_2$ wherein Me may be one or more of Al, Mg, Ti, B, Ga, or Si and 0<x,y,z<1, and LiMc$_{0.5}$Mn$_{1.5}$O$_4$ wherein Mc is a divalent metal, and mixtures thereof.

18. The method of claim 10 wherein the anode comprises a material selected from the group consisting of crystalline carbon, lithium metal, LiMnO$_2$, LiAl, LiZn, Li$_3$Bi, Li$_3$Cd, Li$_3$Sb, Li$_4$Si, Li$_{4.4}$Pb, Li$_{4.4}$Sn, LiC$_6$, Li$_3$FeN$_2$, Li$_{2.6}$Cu$_{0.4}$N, Li$_{2.6}$Cu$_{0.4}$N, Li$_4$Ti$_5$O$_{12}$, and combinations thereof.

* * * * *